United States Patent
Sawatani et al.

(10) Patent No.: US 7,794,327 B2
(45) Date of Patent: Sep. 14, 2010

(54) GAME APPARATUS AND STORAGE MEDIUM

(75) Inventors: Yuji Sawatani, Kyoto (JP); Motoi Okamoto, Kyoto (JP); Shigeru Miyamoto, Kyoto (JP)

(73) Assignee: Nintento Co., Ltd., Kyoto (JP)

(*) Notice: Subject to any disclaimer, the term of this patent is extended or adjusted under 35 U.S.C. 154(b) by 1331 days.

(21) Appl. No.: 11/253,639

(22) Filed: Oct. 20, 2005

(65) Prior Publication Data

US 2006/0089198 A1  Apr. 27, 2006

(30) Foreign Application Priority Data

Oct. 27, 2004 (JP) ............................... 2004-312976

(51) Int. Cl.
*A63F 9/24* (2006.01)
*A63F 13/00* (2006.01)
*G06F 19/00* (2006.01)

(52) U.S. Cl. ............... 463/37; 463/1; 463/2; 463/3; 463/7; 463/30; 463/31; 463/36

(58) Field of Classification Search ............... 463/2–5, 463/30–33, 36–37
See application file for complete search history.

(56) References Cited

U.S. PATENT DOCUMENTS

| | | | |
|---|---|---|---|
| 6,535,787 B1* | 3/2003 | Inamasu et al. | 700/180 |
| 2002/0007396 A1* | 1/2002 | Takakura et al. | 709/205 |
| 2003/0109301 A1* | 6/2003 | Chudley et al. | 463/23 |
| 2004/0193441 A1* | 9/2004 | Altieri | 705/1 |

FOREIGN PATENT DOCUMENTS

| | | |
|---|---|---|
| JP | 4-246713 | 9/1992 |
| JP | 5-7640 | 2/1993 |
| JP | 5-31256 | 2/1993 |
| JP | 6-28102 | 2/1994 |
| JP | 6-175771 | 6/1994 |

(Continued)

OTHER PUBLICATIONS

Baker, Martin, "Physics—sci.physics—How do I write a computer animation of solid body", Jan. 12-19, 2003, available at <http://www.euclideanspace.com/physics/kinematics/sci_physics.htm>.*

(Continued)

*Primary Examiner*—Dmitry Suhol
*Assistant Examiner*—Werner Garner
(74) *Attorney, Agent, or Firm*—Nixon & Vanderhye P.C.

(57) ABSTRACT

A display device 12 covered by a touch panel 13 displays a game space on a display screen. Position coordinates (tx, ty) obtained when the touch panel 13 is touch-operated are detected at a predetermined periodic cycle. At least one of a movement speed (V) and a movement direction (θ) is calculated as a movement parameter for a second object based on current position coordinates (tx, ty) and position coordinates (tpx, tpy) having been detected in an immediately preceding time. A new movement parameter (V and θ) is determined using movement parameters having been previously determined (Vp and θp) and the newly calculated movement parameter (V and θ). When the first object and the second object satisfy a predetermined positional relationship therebetween, the second object is moved and display-controlled based on the updated movement parameter.

10 Claims, 9 Drawing Sheets

FOREIGN PATENT DOCUMENTS

| JP | 10-55238 | 2/1998 |
| JP | 10-111748 | 4/1998 |
| JP | 2002-939 | 1/2002 |

OTHER PUBLICATIONS

Baker, Martin, "Physics—Collision in 2 dimensions", Jan. 7, 2004, available at <http://web.archive.org/web/20040107231223/www.euclideanspace.com/physics/dynamics/collision/twod/index.htm>.*

Japanese Office Action dated Dec. 19, 2007 issued in 2004-312976 (Notification of Reasons for Refusal—Translated).*

Japanese Office Action dated Mar. 27, 2008 issued in 2004-312976 (Decision to Grant a Patent—Translated).*

* cited by examiner

GAME APPARATUS AND STORAGE MEDIUM

CROSS REFERENCE TO RELATED APPLICATION

The disclosure of Japanese Patent Application No. 2004-312976 is incorporated herein by reference.

TECHNICAL FIELD

The exemplary embodiments disclosed herein relate to a game apparatus and a storage medium, and more particularly to a game apparatus and a storage medium for realizing a game in which a touch panel covering a display screen is used to move an object displayed on the display screen.

BACKGROUND AND SUMMARY

Conventionally, as disclosed in, for example, Japanese Laid-Open Patent Publication No. 5-31256 (hereinafter, referred to as Document 1) and Japanese Laid-Open Patent Publication No. 2002-939 (hereinafter, referred to as Document 2), known is a game for which a player operates a computer or a game by touch-operating an object or a character displayed on a display screen with using a tablet or a touch panel covering the display screen.

Document 1 discloses a golf game in which a player performs touch-operation using a tablet and a pen. In the golf game, measured positions of the pen on the tablet are compared with each other based on information on a track of a movement of the pen, and the largest distance measured is used as a shot power of a ball so as to play the golf game.

Document 2 discloses a golf game for which a player performs touch-operation using a touch panel. In the golf game, when a player touch-operates a touch panel to drag, to the left, an object to be controlled (push button), this operation corresponds to a swing operation. When the player drags, to the right, the object to be controlled, this operation corresponds to a shot operation. In this case, when the drag operation is stopped between the swing operation and the shot operation, a calculation of a carry of the ball is started based on the dragging distance obtained in the swing operation. Then, a speed of the shot operation is obtained so as to calculate a final carry of the ball.

In both techniques disclosed in Document 1 and Document 2, the game proceeds based on information obtained when a player performs touch-operation. That is, in the technique disclosed in Document 1, the largest distance measured is used as it is to determine a carry of a ball based thereon. On the other hand, Document 2 discloses that a carry of a ball is determined based on a dragging distance and a speed of a shot operation However, in a case where a game proceeds based on input information obtained when a player touch-operates a tablet or a touch panel, there is a problem of the touch-operation being influenced by input jiggling. For example, in a case where an input direction (angle) is obtained when a player touch-operates a touch panel, a value different from an expected value is sometimes inputted as the input direction because a value of input information is calculated based on an operation direction obtained when a player taps, presses on, and touches the touch panel with using a finger or a pen and therefore the value of input information depends on how high detection accuracy the touch panel has (for example, 256 dots×192 dots), how smooth an operation surface is, or how strongly the player taps, presses on, or touches the touch panel. If an input direction is determined based on the input information involving such jiggling, an input direction different from an expected input direction is used for processing the game. Further, also when an input speed is obtained through a touch-operation performed on a touch panel, a value different from an expected value is sometimes inputted as a value of input information, thereby resulting in an input speed which is different from an expected value and which involves such jiggling being used for processing the game.

For example, in a case where only an input angle and an input speed obtained when a ball is hit are used for processing the game during a drag operation in the touch-operation, the input angle and input speed involving jiggling, which are obtained only when the ball is hit during the touch operation, are used for processing the game, which requires the player to not only master an operation technique but also control the game operation with higher accuracy. Accordingly, the player sometimes feels that an image is not displayed as expected from his touch-operation.

Moreover, in both techniques disclosed in Document 1 and Document 2, a player is required to directly touch an object to be controlled on a touch panel or a tablet, and a focus has not been placed on enjoying a game operation which is specific to a touch panel operation.

Therefore, a feature of certain exemplary embodiments is to provide a game apparatus and a storage medium for processing a game based on input information which is less affected by input jiggling occurring during the touch operation. Further, another feature of certain exemplary embodiments is to provide a game apparatus and a storage medium which are capable of providing a controllability specific to a touch panel, which is not able to be obtained through an operation of a switch or a joy stick of a controller for use in a game apparatus.

Certain exemplary embodiments have the following aspects to attain the features mentioned above. The reference numerals, step Nos. (a step is abbreviated as S), and the like in parentheses indicate correspondence with drawings described below in order to aid in understanding the certain exemplary embodiments described herein and are not intended to limit, in any way, the scope thereof.

A first aspect of certain exemplary embodiments is directed to a game apparatus (1) for presenting a game in which a player controls a first object (bar B) appearing in a game space to change a position of a second object (shell S) which is different from the first object. The game apparatus comprises: a display section (12); a touch panel (13); an operation position detection section (S52); a position coordinate storage section (S57); a movement parameter calculation section (S81); a movement parameter determination section (S82 to s86 and S88 to S90); a movement parameter storage section (S87 and S91); a first object display control section (S60 to S64); and a second object display control section (S65, and S71 to S74). The display section displays the game space on a display screen. The touch panel is provided such that the display screen of the display section is covered thereby. The operation position detection section detects, at a predetermined periodic cycle, position coordinates (tx, ty) at which the touch panel is touch-operated. The position coordinate storage section stores the position coordinates (tpx, tpy) detected by the operation position detection section. The movement parameter calculation section calculates at least one of a movement speed (V) and a movement direction θ as a movement parameter for the second object based on current position coordinates (tx, ty) and position coordinates (tpx, tpy) having been detected in an immediately preceding time. The movement parameter determination section determines a new movement parameter (V, θ) using the movement parameters (Vp, θp) having been previously determined and the movement parameter (V, θ) calculated by the movement parameter calculation section (S86 and S90). The movement parameter storage section stores the movement parameter determined by the movement parameter determination section. The first object display control section display-controls the first object according to the position coordinates detected by the operation position detection section. The second object display control section moves and display-controls the second object based on the updated movement parameter stored in the movement parameter storage section, when the first object and the second object satisfy a predetermined positional relationship therebetween (Yes in S65).

In a second aspect based on the first aspect, the movement parameter determination section calculates an average between the movement parameter calculated by the movement parameter calculation section and a plurality of movement parameters which have been previously determined and which are stored in the movement parameter storage section, thereby determining a new movement parameter.

In a third aspect based on the first aspect, the movement parameter determination section calculates an average between the movement parameter calculated by the movement parameter calculation section and the movement parameter which has been determined in an immediately preceding time and which is stored in the movement parameter storage section, thereby determining a new movement parameter.

In a fourth aspect based on the first aspect, the movement parameter calculation section calculates both a movement speed and a movement direction as the movement parameter for the second object. The movement parameter determination section calculates an average between the movement direction calculated by the movement parameter calculation section and the movement direction which has been determined in an immediately preceding time and which is stored in the movement parameter storage section, thereby determining a new movement direction (S90). The movement parameter determination section calculates, when the movement speed calculated by the movement parameter calculation section is lower than the movement speed which has been determined in an immediately preceding time and which is stored in the movement parameter storage section (Yes in S85), an average between the movement speed which has been determined in the immediately preceding time and the movement speed calculated by the movement parameter calculation section, thereby determining a new movement speed. The movement parameter determination section determines, as a new movement speed, the movement speed calculated by the movement parameter calculation section when the movement speed calculated by the movement parameter calculation section is higher than or equal to the movement speed which has been determined in an immediately preceding time (No. in S85).

In a fifth aspect based on the first aspect, the movement parameter calculation section calculates the movement parameter at the predetermined periodic cycle by using, as current position coordinates, position coordinates detected during a current periodic cycle, and using, as position coordinates having been detected in an immediately preceding time, position coordinates which have been detected during an immediately preceding periodic cycle.

In a sixth aspect based on the fifth aspect, the movement parameter calculation section obtains a motion vector (Δtx, Δty) to current position coordinates from position coordinates which have been detected in an immediately preceding time and calculates, as the movement parameter, at least one of a movement speed and a movement direction based on the motion vector.

In a seventh aspect based on the first aspect, the game apparatus further comprises an initial position storage section (S51). The initial position storage section stores initial position coordinates (Bx, By) which are used for initially displaying the first object on the display screen. The first object display control section display-controls, according to position coordinates detected by touch-operating the touch panel with the operation position detection section, the first object using relative position data (Rx, Ry) indicating a relative positional relationship between the initial position coordinates and position coordinates detected by touch-operating the touch panel with the operation position detection section.

In an eighth aspect based on the first aspect, the game apparatus further comprises a target display section (231) and a score calculation section (S75). The target display section sets, in the game space, a target (target T) which is an object toward which the second object is moved and displays the target on the display screen. The second object display control section reduces, in one or more increments of a predetermined amount, a speed of the second object being moved based on the movement parameter, and display-controls the second object (S73). The score calculation section calculates a score for the game using a positional relationship between position coordinates of the target and position coordinates at which the movement speed of the second object is reduced to zero.

A ninth aspect of certain exemplary embodiments is directed to a game apparatus for presenting a game in which a player controls an object appearing in a game space to change a position of the object. The game apparatus comprises: a display section; a touch panel; an operation position detection section; a position coordinate storage section; a movement parameter calculation section; a movement parameter determination section; a movement parameter storage section; and an object display control section. The display section displays the game space on a display screen. The touch panel is provided such that the display screen of the display section is covered thereby. An operation position detection section detects, at a predetermined periodic cycle, position coordinates at which the touch panel is touch-operated. The position coordinate storage section stores the position coordinates detected by the operation position detection section. The movement parameter calculation section calculates at least one of a movement speed and a movement direction as a movement parameter for the object based on current position coordinates and position coordinates having been detected in an immediately preceding time. The movement parameter determination section determines a new movement parameter using the movement parameters having been previously determined and the movement parameter calculated by the movement parameter calculation section. The movement parameter storage section stores the movement parameter determined by the movement parameter determination section. The object display control section display-controls the object according to the position coordinates detected by the operation position detection section, and moves and display-controls the object based on the updated movement parameter stored in the movement parameter storage section, when a predetermined condition is satisfied.

A tenth aspect of the certain exemplary embodiments is directed to a storage medium having stored thereon a game program executed by a computer of a game apparatus for presenting a game in which a player controls a first object appearing in a game space to change a position of a second object which is different from the first object. The game apparatus includes a display section for displaying the game space on a display screen, a touch panel provided such that the display screen of the display section is covered thereby, and a storage section (22). The game program causes the computer to execute: an operation position detection step (S52); a position coordinate storage step (S57); a movement parameter calculation step (S81); a movement parameter determination step (S82 to S86 and S88 to S90); a movement parameter storage step (S87 and S91); a first object display control step (S60 to S64); and a second object display control step (S65 and S71 to S74). The operation position detection step detects, at a predetermined periodic cycle, position coordinates at which the touch panel is touch-operated. The position coordinate storage step stores, in the storage section, the position coordinates detected in the operation position detection step. The movement parameter calculation step calculates at least one of a movement speed and a movement direction as a movement parameter for the second object based on current position coordinates and position coordinates having been detected in an immediately preceding time. The movement parameter determination step determines a new movement parameter using the movement parameters having been previously determined and the movement parameter calculated in the movement parameter calculation step. The movement parameter storage step stores, in the storage section, the movement parameter determined in the movement parameter determination step. The first object display control step display-controls the first object according to the position coordinates detected in the operation position detection step. The second object display control step moves and display-controls the second object based on the updated movement parameter stored in the movement parameter storage step, when the first object and the second object satisfy a predetermined positional relationship therebetween.

In an eleventh aspect based on the tenth aspect, the movement parameter determination step calculates an average between the movement parameter calculated in the movement parameter calculation step and a plurality of movement parameters which have been previously determined and which are stored in the storage section in the movement parameter storage step, thereby determining a new movement parameter.

In a twelfth aspect based on the tenth aspect, the movement parameter determination step calculates an average between the movement parameter calculated in the movement parameter calculation step and the movement parameter which has been determined in an immediately preceding time and which is stored in the storage section in the movement parameter storage step, thereby determining a new movement parameter.

In a thirteenth aspect based on the tenth aspect, the movement parameter calculation step calculates both a movement speed and a movement direction as the movement parameter for the second object. The movement parameter determination step calculates an average between the movement direction calculated in the movement parameter calculation step and the movement direction which has been determined in an immediately preceding time and which is stored in the storage section in the movement parameter storage step, thereby determining a new movement direction. The movement parameter determination step calculates, when the movement speed calculated in the movement parameter calculation step is lower than the movement speed which has been determined in an immediately preceding time and which is stored in the storage section in the movement parameter storage step, an average between the movement speed which has been determined in the immediately preceding time and the movement speed calculated in the movement parameter calculation step, thereby determining a new movement speed. The movement parameter determination step determines, as a new movement speed, the movement speed calculated in the movement parameter calculation step when the movement speed calculated in the movement parameter calculation step is higher than or equal to the movement speed which has been determined in an immediately preceding time.

In a fourteenth aspect based on the tenth aspect, the movement parameter calculation step calculates the movement parameter at the predetermined periodic cycle by using, as current position coordinates, position coordinates detected during a current periodic cycle, and using, as position coordinates having been detected in an immediately preceding time, position coordinates which have been detected during an immediately preceding periodic cycle.

In a fifteenth aspect based on the fourteenth aspect, the movement parameter calculation step obtains a motion vector to current position coordinates from position coordinates which have been detected in an immediately preceding time and calculates, as the movement parameter, at least one of a movement speed and a movement direction based on the motion vector.

In a sixteenth aspect based on the tenth aspect, the game program causes the computer to further execute an initial position storage step (S51). The initial position storage step stores, in the storage section, initial position coordinates which are used for initially displaying the first object on the display screen. The first object display control step display-controls, according to position coordinates detected by touch-operating the touch panel in the operation position detection step, the first object using relative position data indicating a relative positional relationship between the initial position coordinates and position coordinates detected by touch-operating the touch panel in the operation position detection step.

In a seventeenth aspect based on the tenth aspect, the game program causes the computer to further execute a target display step (231) and a score calculation step (S75). The target display step sets, in the game space, a target which is an object toward which the second object is moved, and displays the target on the display screen. The second object display control step reduces, in one or more increments of a predetermined amount, a speed of the second object being moved based on the movement parameter, and display-controls the second object. The score calculation step calculates a score for the game using a positional relationship between position coordinates of the target and position coordinates at which the movement speed of the second object is reduced to zero.

An eighteenth aspect of the certain exemplary embodiments is directed to a storage medium having stored thereon a game program executed by a computer of a game apparatus for presenting a game in which a player controls an object appearing in a game space to change a position of the object. The game apparatus includes a display section for displaying the game space on a display screen, a touch panel provided such that the display screen of the display section is covered thereby, and a storage section. The game program causes the computer to execute: an operation position detection step; a position coordinate storage step; a movement parameter calculation step; a movement parameter determination step; a movement parameter storage step; and an object display control step. The operation position detection step detects, at a predetermined periodic cycle, position coordinates at which the touch panel is touch-operated. The position coordinate storage step stores, in the storage section, the position coordinates detected in the operation position detection step. The movement parameter calculation step calculates at least one of a movement speed and a movement direction as a movement parameter for the object based on current position coordinates and position coordinates having been detected in an immediately preceding time. The movement parameter determination step determines a new movement parameter using the movement parameters having been previously determined and the movement parameter calculated in the movement parameter calculation step. The movement parameter storage step stores, in the storage section, the movement parameter determined in the movement parameter determination step. The object display control step display-controls the object according to the position coordinates detected in the operation position detection step, and moves and display-controls the object based on the updated movement parameter stored, in the storage section, in the movement parameter storage step, when a predetermined condition is satisfied.

According to the first aspect, it is possible to provide a game in which a player controls a first object through a touch-operation so as to change a movement of a second object according to the control. A movement parameter for the second object is calculated based on input information obtained when the player touch-operates a touch panel, and a new movement parameter is determined using movement parameters which have been previously determined and a movement parameter which is currently calculated, thereby reducing an influence of input jigging occurring at the touch-operation. Further, input information obtained when the player touch-operates the touch panel are all stored and a movement parameter is finally determined using all the stored input information. Therefore, it is possible to provide the player with a controllability specific to a touch panel, which is not able to be obtained from an operation of a switch or a joy stick of a controller for use in a game apparatus.

According to the second aspect, a new movement parameter is obtained by calculating an average between a plurality of movement parameters which have been previously determined and a movement parameter which is currently calculated, thereby further reducing an influence of input jiggling occurring at the touch-operation.

According to the third aspect, a new movement parameter is obtained by calculating an average between a movement parameter which has been determined in an immediately preceding time and a movement parameter which is currently calculated, thereby reducing processing load and an influence of input jiggling occurring at the touch-operation.

According to the fourth aspect, a movement direction and a movement speed which are less affected by input jiggling occurring at the touch-operation can be obtained so as to be applied to the second object. Further, in a case where obtained is the movement speed which is applied to the second object, when a speed at which the player is touch-operating the touch panel is increased, the increased speed is used as it is as input information, and when a speed at which the player is touch-operating the touch panel is reduced, the deceleration for the touch operation is reduced. Therefore, a speed can be maintained with the touch-operation of increased speed having a higher priority.

According to the fifth aspect, touch position coordinates obtained at the touch-operation are detected at a predetermined periodic cycle (for example, for each display frame), thereby enabling a processing load to be reduced.

According to the sixth aspect, a movement speed or a movement angle is calculated based on a difference between positions at which touch-operations are performed (motion vector). Thereby, data which can be easily processed can be provided.

According to the seventh aspect, the first object is display-controlled based on relative input data. Thereby, the whole operation screen of the touch panel can be used so as to perform an operation for moving the first object. Therefore, the player does not necessarily have to directly touch the first object to be controlled, thereby enabling the player to visually confirm the first object with more ease.

According to the eighth aspect, when the second object is display-controlled, a score for the game is calculated based on a positional relationship between a position of a target and a position at which the second object stops after gradually reducing the speed. Therefore, the player has to consider how to manipulate the first object so as to properly move the second object, thereby entertaining the player well during the game.

According to the ninth aspect, it is possible to provide a game in which a player controls an object through a touch-operation so as to change a movement of the object according to the control. A movement parameter for the object is calculated based on input information obtained when the player touch-operates a touch panel, and a new movement parameter is determined using movement parameters which have been previously determined and a movement parameter which is currently calculated, thereby reducing an influence of input jigging occurring at the touch-operation. Further, input information obtained when the player touch-operates the touch panel are all stored and a movement parameter is finally determined using all the stored input information. Therefore, it is possible to provide the player with a controllability specific to a touch panel, which is not able to be obtained through an operation of a switch or a joy stick of a controller for use in a game apparatus.

Moreover, when a storage medium according to the certain exemplary embodiments is executed by a computer, an effect similar to an effect achieved by the aforementioned game apparatus can be obtained.

These and other features, aspects and advantages of the certain exemplary embodiments will become more apparent from the following detailed description when taken in conjunction with the accompanying drawings.

DETAILED DESCRIPTION

Figure 1:
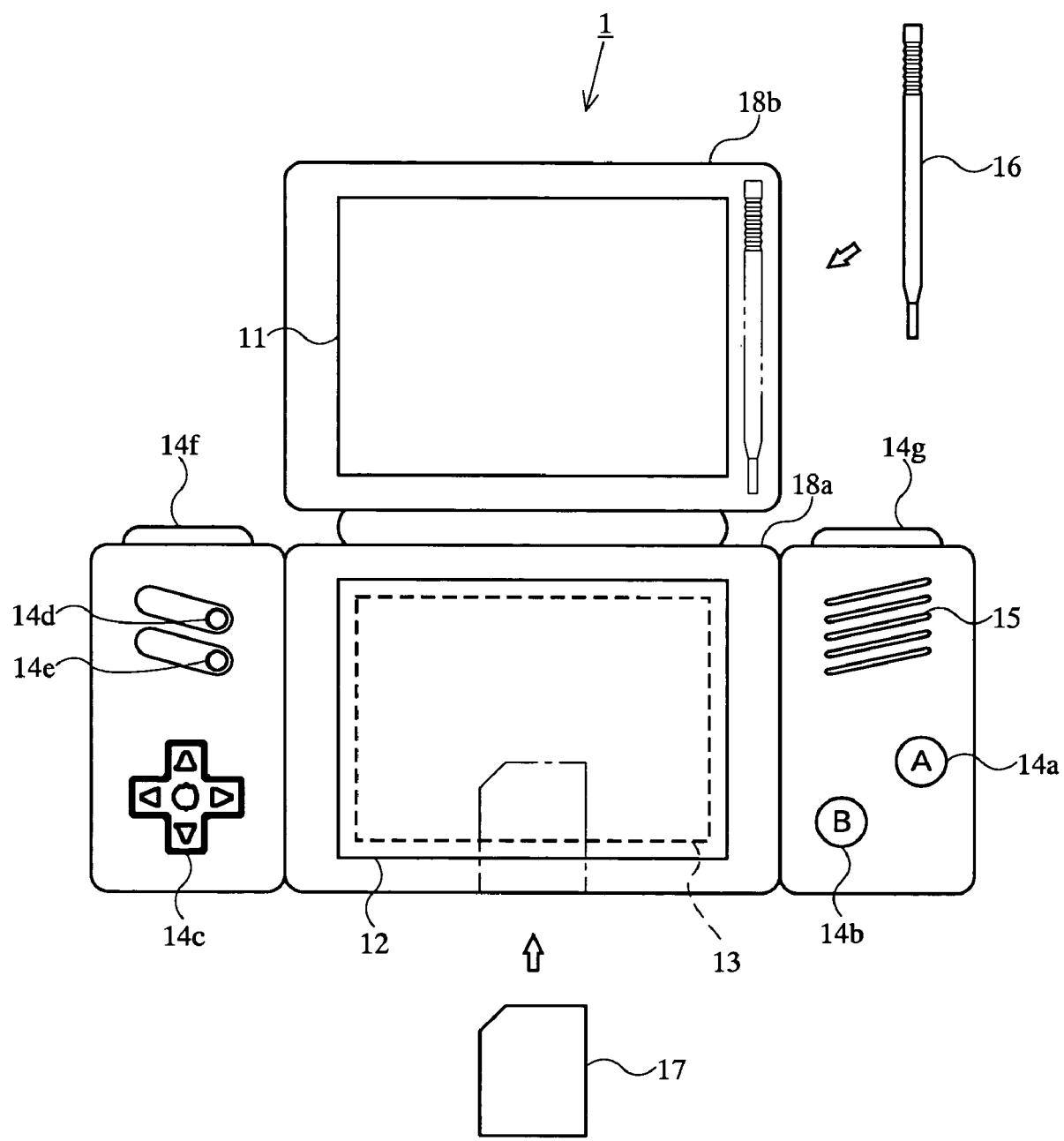
FIG. 1 is an outline view illustrating a game apparatus executing a game program according to one exemplary embodiment.

A game apparatus which executes a game program according to certain exemplary embodiments will be described with reference to the drawings. FIG. 1 is an outline view illustrating a game apparatus 1 which executes a game program a certain exemplary embodiment. Here, a portable game apparatus is shown as an example of the game apparatus 1.

In FIG. 1, the game apparatus 1 according to a certain exemplary embodiment is accommodated in a housing 18 so that two liquid crystal display devices (hereinafter, referred to as "LCDs") 11 and 12 are placed in predetermined positions. Specifically, in a case where the first LCD 11 and the second LCD 12 are to be positioned one on top of the other, the housing 18 is composed of a lower housing 18a and an upper housing 18b, the upper housing 18b being pivotably supported by a portion of the upper side of the lower housing 18a. The upper housing 18b has a planar contour which is slightly larger than that of the first LCD 11. The upper housing 18b has an opening in one principal face thereof, through which a display screen of the first LCD 11 is exposed. The lower housing 18a has a more elongated planar contour than that of the upper housing 18b (i.e., so as to have a longer lateral dimension). An opening for exposing the display screen of the second LCD 12 is formed in a portion of the lower housing 18a which lies substantially in the center of the lower housing 18a along the lateral direction. A sound hole for the loudspeaker 15 is formed in either (right or left) wings of the lower housing 18a between which the second LCD 12 is interposed. An operation switch section 14 is provided on the right and left wings of the lower housing 18a between which the second LCD 12 is interposed.

The operation switch section 14 includes: an operation switch ("A" button) 14a and an operation switch ("B" button) 14b, which are provided on a principal face of the right wing of the lower housing 18a (lying to the right of the second LCD 12); a direction switch (cross key) 14c, a start switch 14d, and a select switch 14e, which are provided on a principal face of the left wing of the lower housing 18a (lying to the left of the second LCD 12); and side switches 14f and 14g. The operation switches 14a and 14b are used for giving instructions such as: "pass" "shoot", etc., in the case of a sports game such as a soccer game; "jump", "punch", "use a weapon", etc., in the case of an action game; or "get an item", "select a weapon", "select a command", etc., in the case of a role playing game (RPG) or a simulation RPG. The direction switch 14c is used by a player for providing instructions concerning directions on the game screen, e.g., instructions of movement directions for (i.e., a direction in which to move) a player object (or a player character) that can be controlled by using the operation switch section 14, or instructions of a movement direction for a cursor, for example. The side switch ("L" button) 14f and the side switch ("R" button) 14g are provided at the left and right ends of an upper face (upper side face) of the lower housing 18a. As necessary, more operation switches may be added.

Further, a touch panel 13 (an area marked by dotted lines in FIG. 1) is mounted on the upper principal face of the second LCD 12. The touch panel 13 may be of any one of, for example, a resistive film type, an optical type (infrared type), or a capacitive coupling type. The touch panel 13 is a two-dimensional pointing device which, when a stylus 16 (or a finger) is pressed against or moved or dragged on the upper principal face of the touch panel 13, detects a coordinate position of the stylus 16 and outputs coordinate data.

As necessary, a hole (an area marked by double-dot lines in FIG. 1) for accommodating the stylus 16 with which to manipulate the touch panel 13 is provided near a side face of the upper housing 18b. The hole can hold the stylus 16. In a portion of a side face of the lower housing 18a is provided a cartridge receptacle (an area marked by dash-dot lines in FIG. 1), into which a game cartridge 17 (hereinafter simply referred to as "the cartridge 17") internalizing a memory having a game program stored therein (e.g., a ROM) is detachably inserted. The cartridge 17 is an information storage medium for storing a game program, e.g., a non-volatile semiconductor memory such as a ROM or a flash memory. A connector (see FIG. 2) lies inside the cartridge receptacle for providing electrical connection with the cartridge 17. Furthermore, the lower housing 18a (or alternatively the upper housing 18b) accommodates an electronic circuit board on which various electronic components such as a CPU are mounted. Examples of the information storage medium for storing a game program are not limited to the aforementioned non-volatile semiconductor memory, but may also be a CD-ROM, a DVD, or any other optical disk type storage medium.

Figure 2:
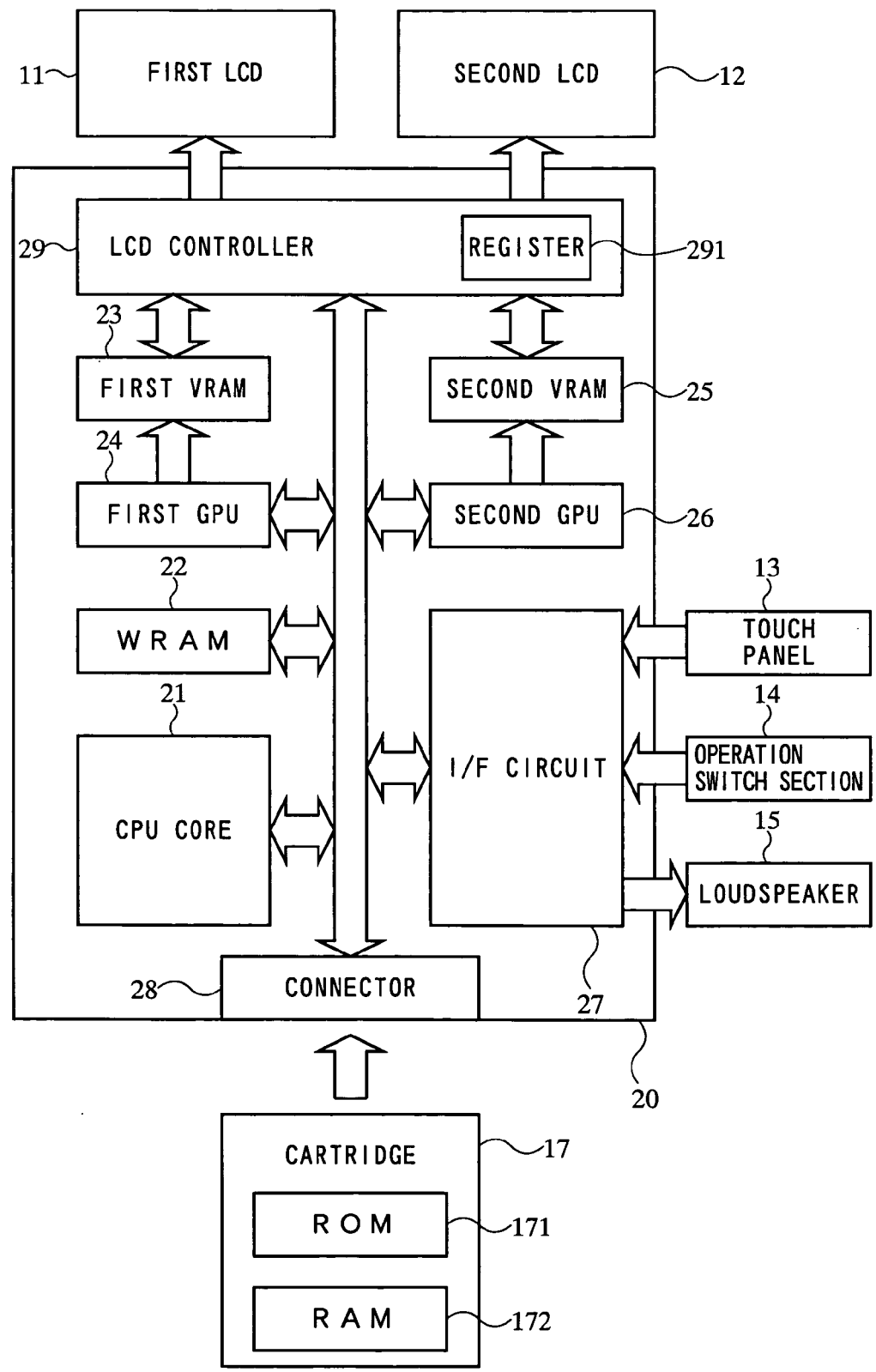
FIG. 2 is a block diagram illustrating a game apparatus 1 shown in FIG. 1.

FIG. 2 is a block diagram illustrating the game apparatus 1. In FIG. 2, a CPU core 21 is mounted on the electronic circuit substrate 20 accommodated in the housing 18. Via a predetermined bus, the CPU core 21 is connected to a connector 28, an input/output interface (I/F) circuit 27, a first graphics processing unit (first GPU) 24, a second graphics processing unit (second GPU) 26, WRAM 22, and an LCD controller 29. The cartridge 17 is detachably connected to the connector 28. The cartridge 17 is a storage medium for storing a game program. Specifically, the cartridge 17 includes a ROM 171 for storing a game program and a RAM 172 for storing backup data in a rewritable manner. A game program which is stored in the ROM 171 of the cartridge 17 is loaded to a WRAM 22, and the game program having been loaded to the WRAM 22 is executed by the CPU core 21. The CPU 21 stores, in the WRAM 22, data from which to generate temporary data and images obtained by executing the game program. The I/F circuit 27 is connected to the operation switch section 14, the touch panel 13 and the loudspeaker 15.

The first GPU 24 is connected to a first video-RAM (hereinafter "VRAM") 23. The second GPU 26 is connected to a second video-RAM (hereinafter "VRAM") 25. In accordance with an instruction from the CPU core 21, the first GPU 24 generates a first game image based on the data used for generation of image which is stored in the WRAM 22, and writes (stores) the image data into the first VRAM 23. In accordance with an instruction from the CPU core 21, the second GPU 26 generates a second game image based on the data used for generation of image which is stored in the WRAM 22, and writes (stores) the image data into the second VRAM 25. The first VRAM 23 and the second VRAM 25 are connected to the LCD controller 29.

The LCD controller 29 includes a register 291. The register 291 stores a value of 0 or 1 according to an instruction from the CPU core 21. When the value in the register 291 is 0, the LCD controller 29 outputs, to the first LCD 11, a game image stored in the first VRAM 23, and outputs, to the second LCD 12, a game image stored in the second VRAM 25. On the other hand, when the value in the register 291 is 1, the LCD controller 29 outputs, to the second LCD 12, a game image stored in the first VRAM 23, and outputs, to the first LCD 11, a game image stored in the second VRAM 25.

The I/F circuit 27 is a circuit which governs exchanges of data between the CPU core 21 and the external input/output devices such as the touch panel 13, the operation switch section 14, and the loudspeaker 15. The touch panel 13 (including a device driver for the touch panel) has a coordinate system corresponding to the coordinate system of the second VRAM 25, and outputs data of position coordinates corresponding to a position which is input (designated) by means of the stylus 16. According to certain exemplary embodiments, the display screen of the second LCD 12 has a resolution of 256 dots×192 dots, and the touch panel 13 also has a detection accuracy of 256 dots×192 dots so as to correspond to the display screen of the second LCD 12. However, the detection accuracy of the touch panel 13 may be lower or higher than the resolution of the display screen of the second LCD 12.

Figure 3:
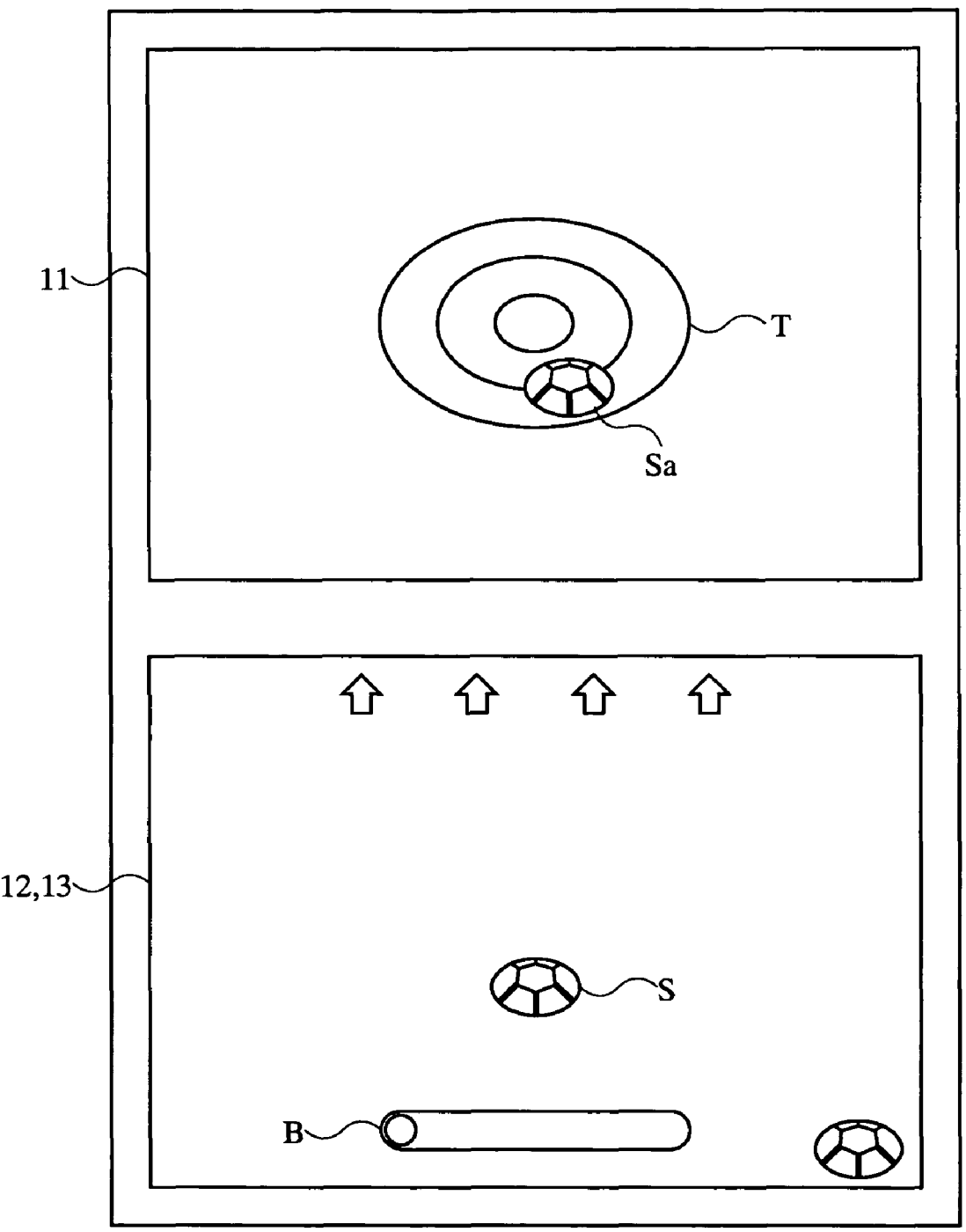
FIG. 3 shows an example of game screens displayed on a first LCD 11 and a second LCD 12 of FIG. 1, respectively.

Hereinafter, an example of a display screen which is obtained by executing the game program by the game apparatus 1 will be specifically described with reference to FIG. 3. FIG. 3 shows an example of game screens displayed on the first LCD 11 and the second LCD 12, respectively.

In a game executed by the game apparatus 1 of certain exemplary embodiments, a portion of a game space is displayed on the first LCD 11 and another portion of the same game space is displayed on the second LCD 12. In the game, a second object (shown as a shell S which moves on a plane in FIG. 3) is moved so as to approach a target set in the game space (shown as a target T which is set on the plane in FIG. 3), thereby performing game play to obtain a higher score. A player is allowed to touch-operate and move only a first object (shown as a bar B in FIG. 3), and the player controls the first object so as to hit the second object, thereby moving the second object on the plane.

As described above, the second LCD 12 is covered by the touch panel 13. The bar B and the shell S which is placed in an initial position on the plane and which has not been hit are displayed on the game screen displayed on the second LCD 12. On the other hand, the target T appearing on the same plane is displayed on the game screen displayed on the first LCD 11. In FIG. 3, the shell Sa which has already stopped near the target T is displayed. The player is allowed to move only the bar B through the touch-operation on the touch panel 13. The player controls the bar B through the touch-operation so as to hit the shell S placed in the initial position toward the target T. When the shell S is hit by the bar B, the shell S moves on the plane according to a speed at and a direction in which the shell S is hit. Eventually, the movement speed is reduced to zero, and the shell S stops on the plane. A score is calculated according to a positional relationship between the target T and the position at which the shell S stops. Specifically, the closer the position at which the shell S stops is to the center of the target T, the higher the obtained score is.

A relationship between the aforementioned touch-operation and the game processing will be more specifically described. When a player touch-operates the touch panel 13 at any position (which may or may not be on the bar B), a relative positional relationship between the position of the bar B and the touch-operated position is obtained. When the player drags (slides) the touch-operated position, the bar B is moved with the aforementioned relative positional relationship being maintained. When a moving distance of the touch-operated position per unit time is shorter than a predetermined number of dots (for example, 2 dots), the bar B is not moved. Further, when the bar B deviates beyond a predetermined movement range during the movement of the bar B, the movement of the bar B is restricted so as to position the bar B within the predetermined movement range. A movement speed and a movement direction which are applied to the shell S having been hit are updated for each unit time during movement of the bar B and previously calculated. When the bar B hits the shell S, the shell S moves on the plane in the game space based on the updated movement speed and movement direction which have been calculated during the movement of the bar B. The movement speed and movement direction which are applied to the shell S having been hit correspond to movement parameters of the certain exemplary embodiments.

Figure 4:
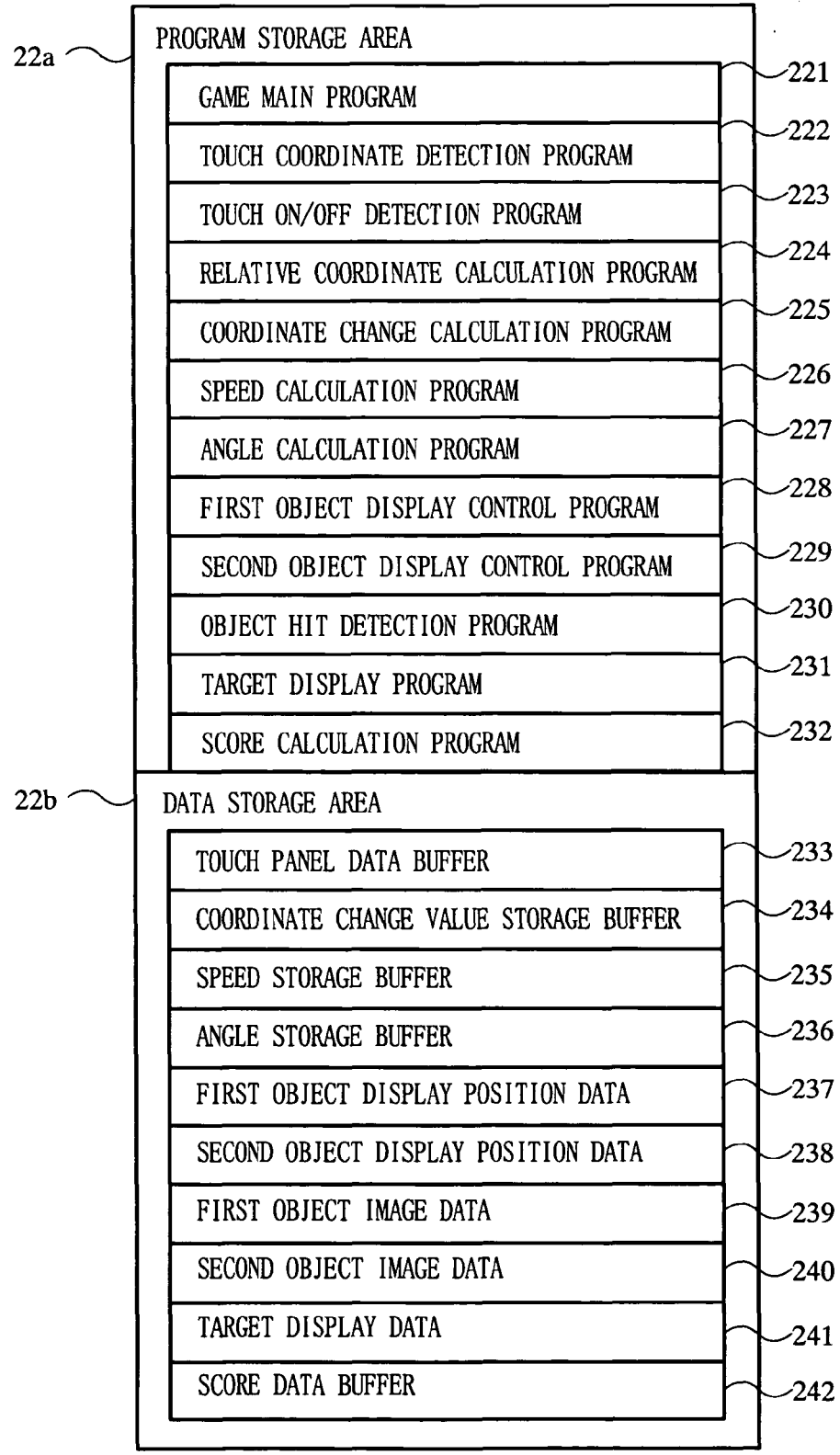
FIG. 4 is a diagram illustrating an image in a WRAM 22 for storing programs, data or the like, which are read from a cartridge 17 of FIG. 1 as necessary.

FIG. 4 is a diagram illustrating an image in WRAM 22 for storing programs, data and the like which are read from the cartridge 17 as necessary. As shown in FIG. 4, the WRAM 22 includes a program storage area 22a for storing commands in a format executable by a computer, particularly, the CPU core 21, of the game apparatus 1, and a data storage area 22b for storing data. Although according to certain exemplary embodiments described herein a game program and data are stored in the cartridge 17, the program and data may be supplied via another medium or a communication line.

The game program which is stored on the program storage area 22a as necessary includes, for example, a game main program 221, a touch coordinate detection program 222, a touch on/off detection program 223, a relative coordinate calculation program 224, a coordinate change calculation program 225, a speed calculation program 226, an angle calculation program 227, a first object display control program 228, a second object display control program 229, an object hit detection program 230, a target display program 231, and a score calculation program 232, when the game program is divided for each function executed by the game apparatus 1.

The game main program 221 is a program for controlling an operation of the whole game processing. The touch coordinate detection program 222 is a program for detecting a touch panel coordinate position (touch coordinates) at which a player touch-operates the touch panel 13 by reading data from a touch panel data buffer 233 described later. The touch on/off detection program 223 is a program for detecting whether or not a player is touching the touch panel 13.

The relative coordinate calculation program 224 is a program for calculating relative coordinates between touch coordinates and a position at which the first object (bar B) is displayed. The coordinate change calculation program 225 is a program for calculating a change of touch coordinates for each unit time. The speed calculation program 226 and the angle calculation program 227 are programs for previously calculating a movement speed and a movement direction which are applied to the second object (shell S) having been hit, respectively, based on a motion vector indicating a change of touch coordinates for each unit time. The speed calculation program 226 and the angle calculation program 227 update a movement speed and a movement direction, respectively, based on a change of touch coordinates, and a movement speed and a movement direction of the second object, which have been calculated in an immediately preceding time.

The first object display control program 228 is executed so as to display an image of the first object (bar B) on the second LCD 12. The second object display control program 229 is executed so as to display an image of the second object (shell S) on the first LCD 11 and the second LCD 12. The target display program 231 is executed so as to display an image of the target (target T) on the first LCD 11.

The object hit detection program 230 is a program for detecting whether or not the first object hits the second object based on game space coordinates of the respective objects. The score calculation program 232 is a program for calculating a score to be added during the game based on a positional relationship in the game space between the target and the second object which has stopped.

Data which are stored in the data storage area 22b as necessary include, for example, a touch panel data buffer 233, a coordinate change value storage buffer 234, a speed storage buffer 235, an angle storage buffer 236, a first object display position data 237, a second object display position data 238, a first object image data 239, a second object image data 240, a target display data 241, and a score data buffer 242.

The touch panel data buffer 233 is a storage area in which input information which is inputted from the touch panel (touch panel coordinate position: touch coordinates) is temporarily stored. The coordinate change value storage buffer 234 is a storage area in which temporarily stored is a change among touch coordinates calculated for each unit time by the coordinate change calculation program 225. The speed storage buffer 235 and the angle storage buffer 236 are storage areas in which temporarily stored are a movement speed and a movement direction of the second object, which have been calculated in an immediately preceding time, so that the speed calculation program 226 and the angle calculation program 227 may update a movement speed and a movement direction which are applied to the second object, respectively. The score data buffer 242 is a storage area in which a score calculated by the score calculation program 232 is temporarily stored.

The first object display position data 237 is position data used for placing the first object on a plane in a game space and, specifically, the data 237 is described in the following description as coordinate data which is represented as bar coordinates (Bx, By). The second object display position data 238 is position data used for placing the second object on a plane in a game space and, specifically, the data 238 is described in the following description as coordinate data indicating a position at which the shell S is to be placed. The first object image data 239, the second object image data 240, and the target display data 241 are image data used for displaying objects on the game screen, respectively, and, specifically, the data 239, 240, and 241 are image data used for displaying the bar B, the shell S, and the target T on the game screen in the following description.

Figure 5:
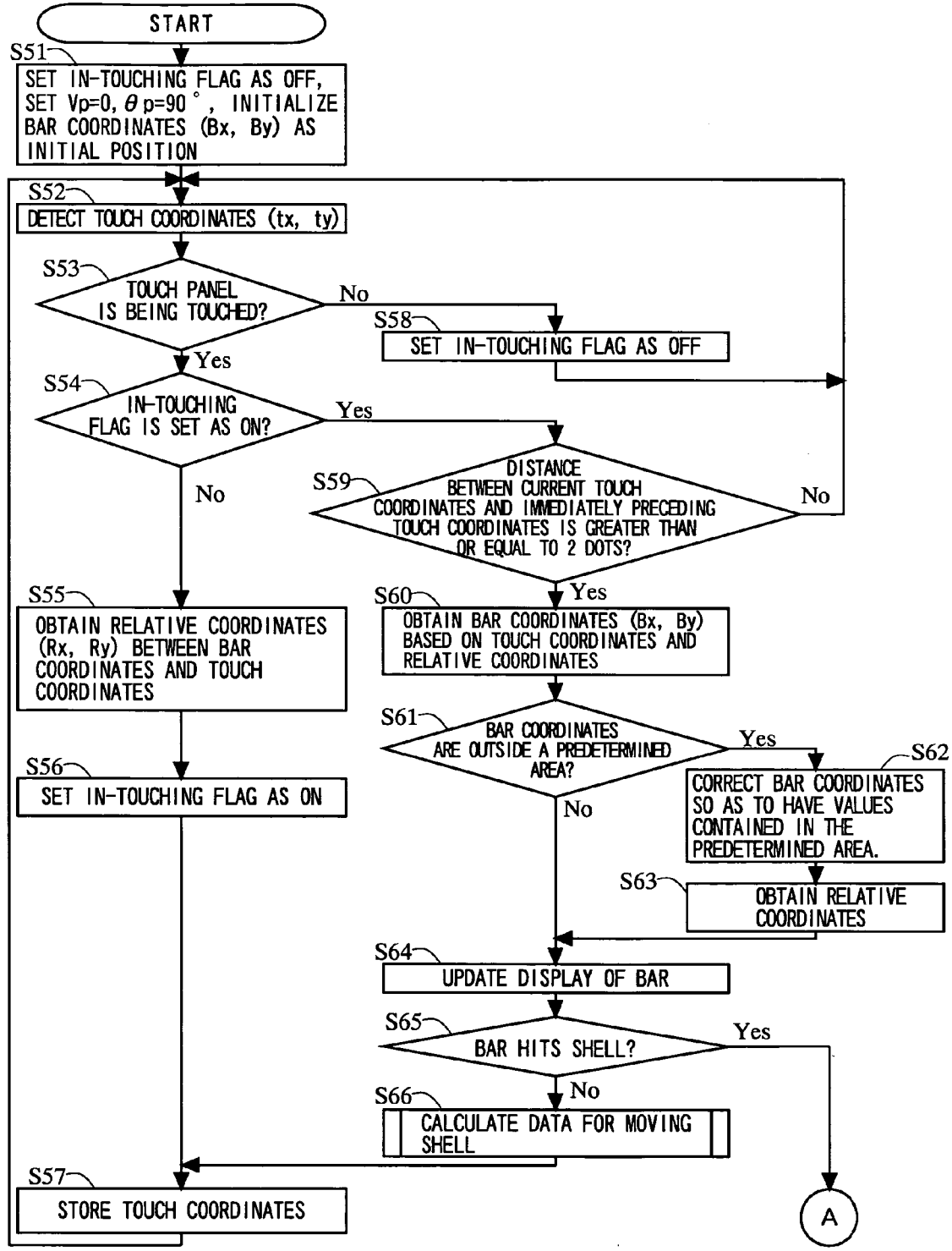
FIG. 5 is a flow chart illustrating a former part of an operation for processing a game by the game apparatus 1 of FIG. 1.
Figure 6:
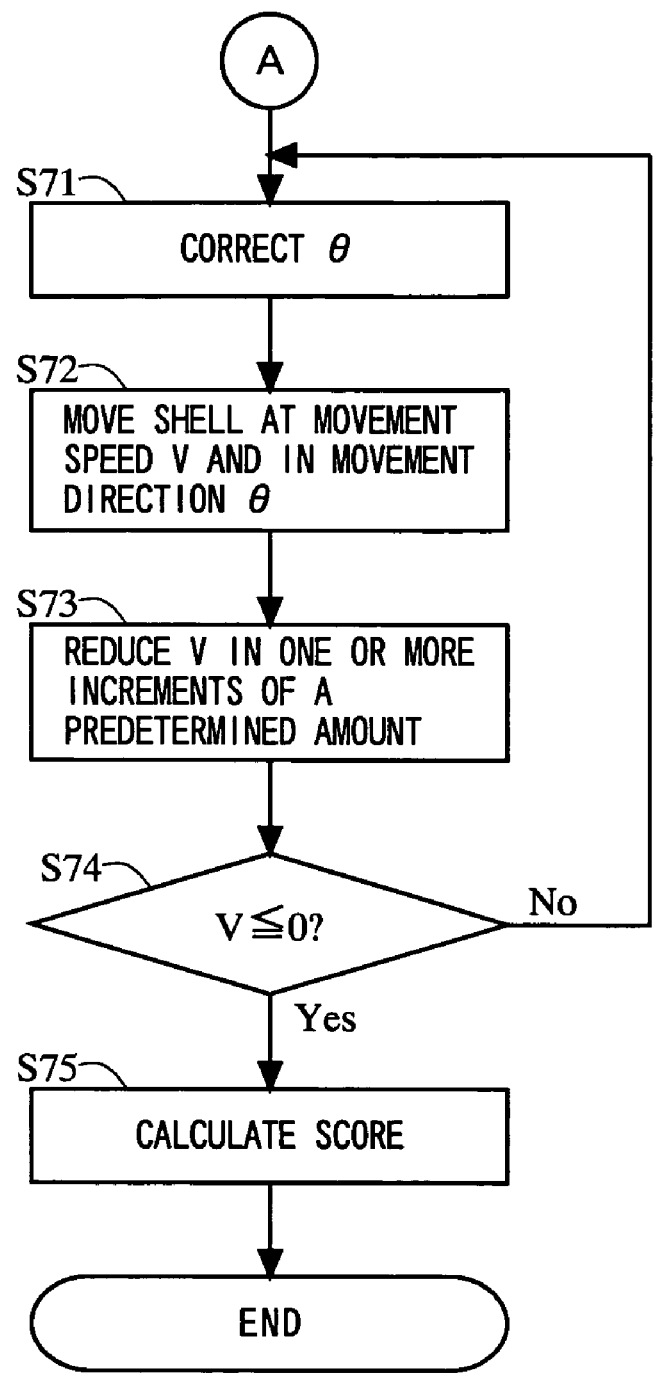
FIG. 6 is a flow chart illustrating a latter part of an operation for processing a game by the game apparatus 1 of FIG. 1.
Figure 7:
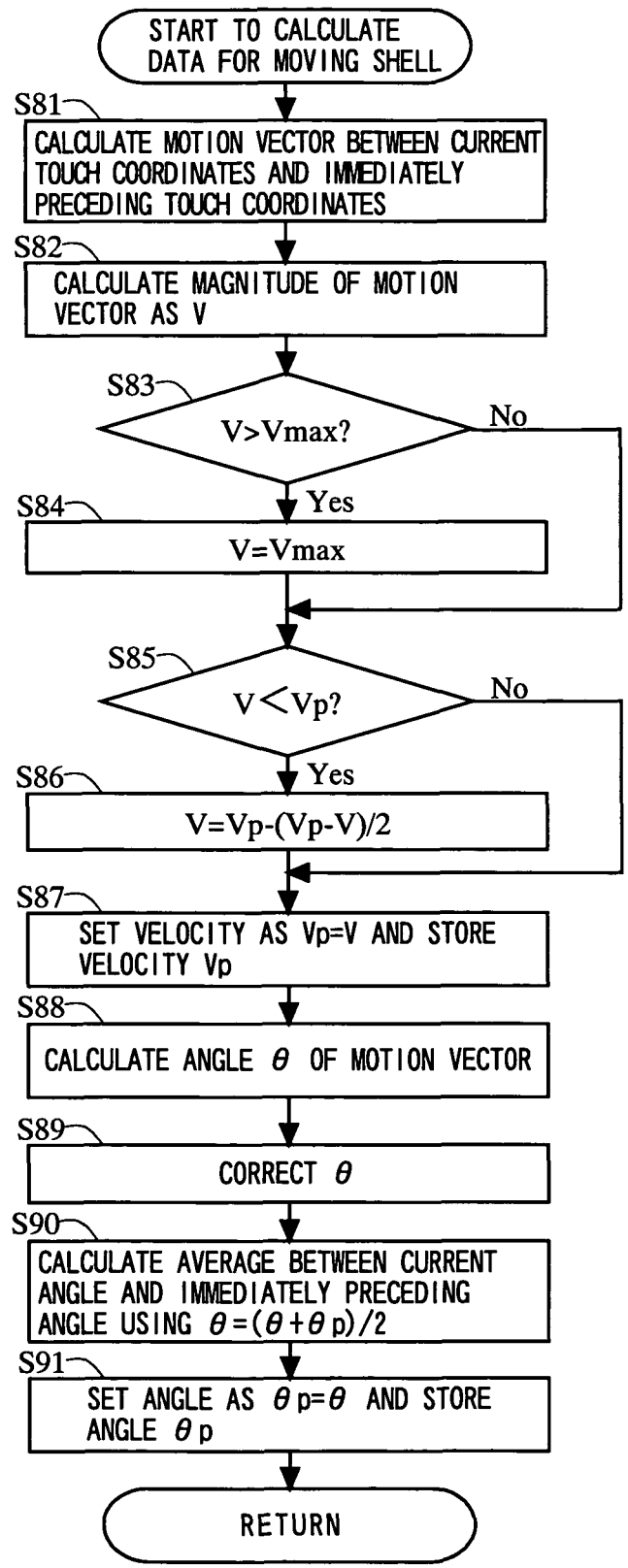
FIG. 7 shows a subroutine as a detailed operation of calculating data for moving a shell in step 66 of FIG. 5.
Figure 8:
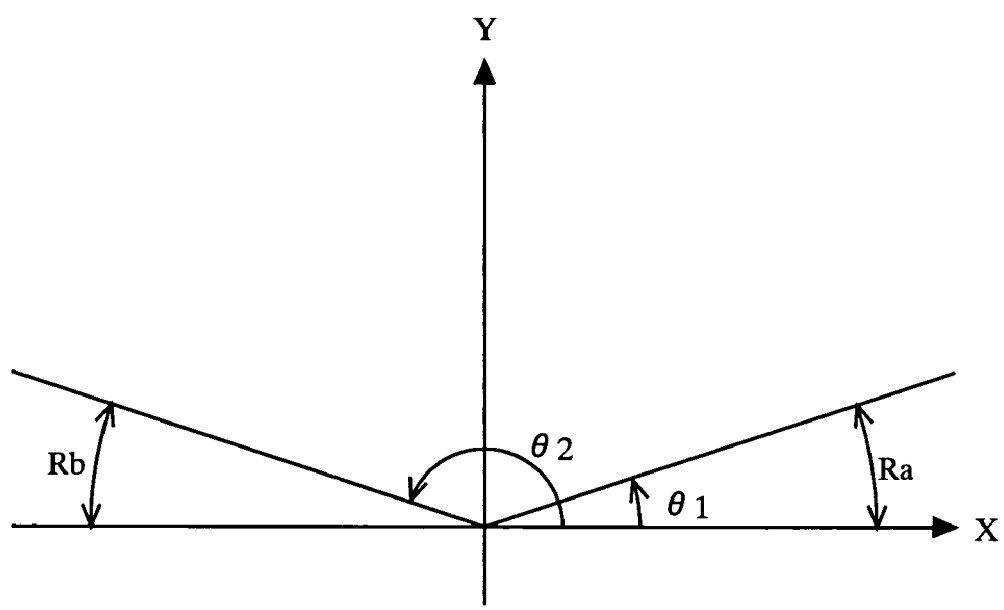
FIG. 8 is a diagram for explaining θ correction in step 71 of FIG. 6.
Figure 9:
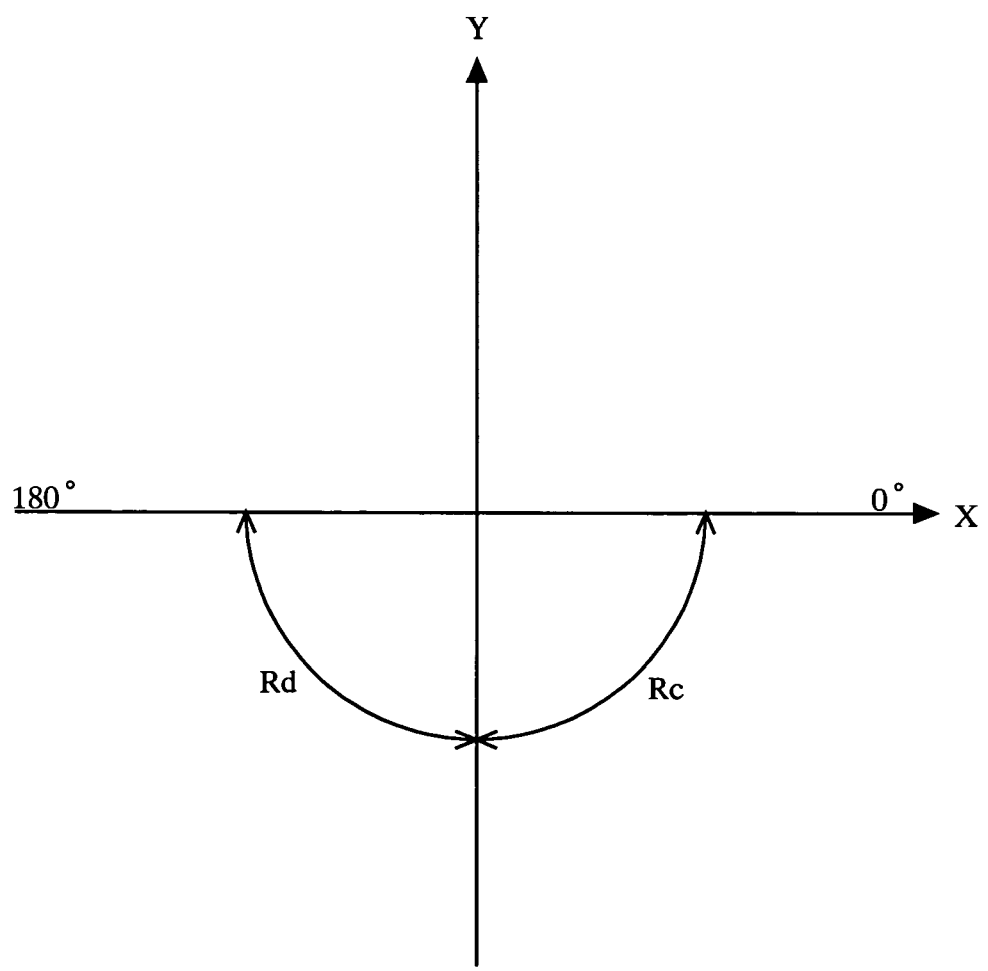
FIG. 9 is a diagram for explaining θ correction in step 89 of FIG. 7.

Next, an game operation processed by the game apparatus 1 will be described with reference to FIGS. 5 to 9. FIG. 5 is a flow chart illustrating a former part of a game operation processed by the game apparatus 1. FIG. 6 is a flow chart illustrating a latter part of a game operation processed by the game apparatus 1. FIG. 7 shows a subroutine as a detailed operation of a process of calculating data for moving a shell in step 66 shown in FIG. 5. FIG. 8 is a diagram for explaining a θ correction process in step 71 shown in FIG. 6. FIG. 9 is a diagram for explaining a θ correction process in step 89 shown in FIG. 7.

Initially, when a power source (not shown) of the game apparatus 1 is turned on, the CPU core 21 executes a boot program (not shown), and thereby the game program stored in the cartridge 17 is loaded to the WRAM 22. The game program having been loaded is executed by the CPU core 21, thereby executing steps (abbreviated as "S" in FIGS. 5 to 7) shown in FIGS. 5 and 6. The game program is executed, and thereby game images and the like in accordance with the game program are written into the first LCD 11 and the second LCD 12.

In FIG. 5, the CPU core 21 performs an initialization for the game process in step 51, and advances the process to the next step. Specifically, the CPU core 21 sets an in-touching flag as OFF, sets a movement speed Vp=0, and sets a movement direction θp=90° (a positive direction of y axis) when a positive direction of x axis is set to 0° as a reference value, and sets bar coordinates (Bx, By) as an initial position of the bar. Depending on a coordinate system, a backward direction on the touch panel is sometimes set as a positive direction of y axis. In this case, θp=270 is set.

Next, in step 52, the CPU core 21 detects touch coordinates (tx, ty) which are obtained when a player touch-operates the touch panel 13. Step 52 is repeatedly performed for each display frame which is a process unit for game processing.

Each display frame is used as a process unit also for other steps. The CPU core 21 determines whether or not the player is touch-operating the touch panel 13 in step 53. When the player is touch-operating the touch panel 13, the CPU core 21 advances the process to the next step 54. On the other hand, when the player is not touch-operating the touch panel 13, the CPU core 21 sets the in-touching flag as OFF in step 58, and returns the process to the step 52 and repeats the same process.

In step 54, the CPU core 21 determines whether or not the in-touching flag is set as ON. When the in-touching flag is set as ON, the CPU core 21 advances the process to the next step 59. When the in-touching flag is set as OFF, the CPU core 21 advances the process to the next step 55.

In step S55, the CPU core 21 obtains relative coordinates between the bar coordinates and the touch coordinates. Specifically, the CPU core 21 uses the bar coordinates (Bx, By) and the touch coordinates (tx, ty) to obtain relative coordinates (Rx, Ry) as follows:

$$Rx=Bx-tx$$

$$Ry=By-ty$$

The CPU core 21 sets the in-touching flag as ON in step 56, and advances the process to the next step.

Next, the CPU core 21 stores the current touch coordinates in step 57, and returns the process to the step 52 and repeats the same process. Specifically, the CPU core 21 stores the current touch coordinates (tx, ty) as touch coordinates (tpx, tpy).

When the CPU core 21 determines in step 54 that the in-touching flag is set as ON, the CPU core 21 determines whether or not a distance between the current touch coordinates and the immediately preceding touch coordinates is greater than or equal to 2 dots in step 59. Specifically, the CPU core 21 calculates a distance between the touch coordinates (tpx, tpy) stored in the step 57 and the current touch coordinates (tx, ty) detected in the step 52, thereby determining whether or not the distance is greater than or equal to 2 dots. When the distance is greater than or equal to 2 dots, the CPU core 21 advances the process to the next step 60. On the other hand, when the distance is less than 2 dots, the CPU core 21 returns the process to the step 52 and repeats the same process.

In step 60, the CPU core 21 uses the current touch coordinates and the relative coordinates to obtain bar coordinates. Specifically, the CPU core 21 uses the touch coordinates (tx, ty) and the relative coordinates (Rx, Ry) to obtain the bar coordinates (Bx, By) as follows:

$$Bx=Rx+tx$$

$$By=Ry+ty$$

The CPU core 21 advances the process to the next step.

Next, the CPU core 21 determines whether or not the bar coordinates (Bx, By) obtained in the step 60 are outside a predetermined area in step 61. Here, the predetermined area is an area which is previously set as a range in which the bar B (see FIG. 3) is allowed to move on a plane specified in a game space. The CPU core 21 advances the process to the next step 62 when the bar coordinates are outside the predetermined area. When the bar coordinates are within the predetermined area, the CPU core 21 advances the process to the next step 64.

In step 62, the CPU core 21 corrects the bar coordinates (Bx, By) so as to contain the bar coordinates (Bx, By) in the predetermined area. In step 63, the CPU core 21 obtains new relative coordinates based on the bar coordinates (Bx, By) which have been corrected in the step 62, and advances the process to the next step 64. Specifically, the CPU core 21 uses the bar coordinates (Bx, By) and the touch coordinates (tx, ty) to obtain new relative coordinates (Rx, Ry) as follows:

$$Rx=Bx-tx$$

$$Ry=By-ty$$

In step 64, the CPU core 21 updates a display of the bar B which is displayed on the second LCD 12 based on the bar coordinates (Bx, By) obtained in the step 60 or step 62. The CPU core 21 determines whether the bar B hits the shell S in step 65. Specifically, the CPU core 21 determines whether the bar B hits the shell S using the bar coordinates (Bx, By) and the position coordinates of the shell S. When the CPU core 21 determines that the bar B hits the shell S, the CPU core 21 advances the process to the next step 71 shown in FIG. 6. On the other hand, when the CPU core 21 determines that the bar B does not hit the shell S, the CPU core 21 advances the process to the next step 66.

In step 66, the CPU core 21 calculates data for moving the shell and advances the process to the step 57. Hereinafter, an operation for calculating the data for moving the shell in step 66 will be described in detail with reference to FIG. 7.

In FIG. 7, the CPU core 21 calculates a motion vector from the immediately preceding touch coordinates to the current touch coordinates in step 81, and advances the process to the next step. Specifically, the CPU core 21 uses the touch coordinates (tpx, tpy) stored in the step 57 and the current touch coordinates (tx, ty) detected in the step 52 to calculate the motion vector ($\Delta tx$, $\Delta ty$) as follows:

$$\Delta tx = tx - tpx$$

$$\Delta ty = ty - tpy$$

Next, the CPU core 21 calculates a magnitude of the motion vector obtained in the step 81 as a velocity V in step 82, and advances the process to the next step. Specifically, the CPU core 21 calculates the velocity V as follows:

$$V = \sqrt{\Delta tx^2 + \Delta ty^2}$$

When there is some inconvenience, for example, when a value of the velocity to be obtained is too large to be processed, the value of the velocity may be multiplied by a predetermined coefficient so as to be corrected.

Next, the CPU core 21 determines whether or not the velocity V calculated in the step 82 is higher than a predetermined maximum velocity Vmax in step 83. When the velocity V is higher than the maximum velocity Vmax, the CPU core 21 sets the velocity V as the maximum velocity Vmax in step 84, and advances the process to the next step 85. On the other hand, when the velocity V is lower than or equal to the maximum velocity Vmax, the CPU core 21 advances the process to the next step 85.

In step 85, the CPU core 21 determines whether or not velocity V is lower than the velocity Vp having been set and stored in an immediately preceding time. When the velocity V is lower than the velocity Vp, the CPU core 21 calculates an average between the velocity Vp and the velocity V, sets the average as a new velocity V in step 86, and advances the process to the next step 87. Specifically, the CPU core 21 calculates the new velocity V using Vp−(Vp−V)/2. On the other hand, when the velocity V is higher than or equal to the velocity Vp, the CPU core 21 advances the process to the next step 87.

In step 87, the CPU core 21 sets, as the velocity Vp, the velocity V which is currently set and stores the velocity Vp. The CPU core 21 calculates an angle θ of the motion vector in step 88, and advances the process to the next step. Specifically, the CPU core 21 uses the motion vector ($\Delta tx$, $\Delta ty$) to calculate the angle θ as follows:

$$\theta = \arctan(\Delta ty / \Delta tx)$$

Next, in step 89, the CPU core 21 makes a correction of the angle θ calculated in the step 88, and advances the process to the next step. As shown in FIG. 9, the CPU core 21 makes a correction so as to set θ=0° when 270°<θ≦360° (a range Rc shown in FIG. 9). On the other hand, the CPU core 21 makes a correction so as to set θ=180° when 180°<θ≦270° (a range Rd shown in FIG. 9).

Next, in step 90, the CPU core 21 calculates, as a new angle θ, an average between the angle θp which has been set in an immediately preceding time and the angle θ which is currently set. Specifically, the CPU core 21 calculates the new angle θ using (θ+θp)/2. The CPU core 21 sets, as an angle θp, the angle θ which is currently set, and stores the angle θp in step 91, and completes the process according to the subroutine.

The step 71 and the subsequent steps will be described with reference to FIG. 6. As described above, when the CPU core 21 determines that the bar B hits the shell S (Yes in step 65), the CPU core 21 advances the process to step 71. In step 71, the CPU core 21 makes a correction of the angle θ which has been calculated in the step 66, and advances the process to the next step. As shown in FIG. 8, the CPU core 21 makes a correction so as to set θ=θ1 when 0°≦θ<θ1 (a range Ra shown in FIG. 8; 0°<θ1<90°). On the other hand, the CPU core 21 makes a correction so as to set θ=θ2 when θ2<θ≦θ180° (a range Rb shown in FIG. 8; 90°<θ2<180°).

Next, the CPU core 21 sets a movement speed of the shell S as a velocity V and sets a movement direction of the shell S as an angle θ, moves the shell S along the plane specified in the game space, and calculates position coordinates of the shell S in step 72. The CPU core 21 reduces the velocity V by a predetermined amount in step 73, and advances the process to the next step.

Next, the CPU core 21 determines whether or not the velocity V is lower than or equal to zero in step 74. When the velocity V is lower than or equal to zero, the CPU core 21 advances the process to the next step 75. On the other hand, when the velocity V is higher than zero, the CPU core 21 returns the process to the step 71 and repeats the same process.

In step 75, the CPU core 21 calculates a score and ends the process according to the flow chart. Here, the CPU core 21 increases a score according to a positional relationship between the target T and the position at which the shell S has the movement speed reduced to zero (that is, the shell S stops). In general, the closer the position at which the shell S stops is to the center of the target T, the higher the obtained score is.

According to the result of the determination step of step 85, an average between the velocity V and the immediately preceding velocity Vp is calculated only when a velocity is reduced. Thereby, when a speed at which the player touch-operates the touch panel 13 is being increased, the speed is used as input information. On the other hand, when a speed at which the player touch-operates the touch panel 13 is being reduced, a deceleration for the touch operation is reduced. When these effects are not anticipated, step 85 may be skipped and, as to each of the velocity V, an average between the velocity V and the immediately preceding velocity Vp may be calculated.

Further, while the averaging for a velocity V and an angle θ is performed using two values, that is, a current value and the immediately preceding value, an average between three or more values may be calculated. When the speed storage buffer 235 and the angle storage buffer 236 store previous values, the averaging is possible using more than two values Thus, it is possible to provide a game in which a player controls the first object such as the bar B which hits the shell S and the like through the touch-operation and, according to the control, the movement of the second object such as the shell S is changed. Specifically, when the first object and the second object satisfy a predetermined positional relationship therebetween (when the first object hits the second object), the second object starts to move. Therefore, when this is utilized for a game such as a golf game using an object to be hit such as a ball, a player can be well entertained by playing the game. A movement speed and a movement direction of the second object (shell S) are calculated for each unit time based on input information obtained when the player touch-operates the touch panel 13, and each of the velocity V and the angle θ is obtained by calculating an average between the current value and the value having been calculated in an immediately preceding time, thereby resulting in reduction of an influence of input jiggling occurring at the touch-operation. The input information obtained when the player touch-operates the touch panel 13 are all stored and all the input information are used to determine the final movement speed and movement direction. Therefore, it is possible to provide the player with a controllability specific to a touch panel, which is not able to be obtained through an operation of a switch or a joy stick of a controller for use in a game apparatus. Further, the bar B is display-controlled based on relative input information from the touch panel 13. Therefore, the player is able to use the whole operation screen of the touch panel 13 so as to control and move the bar B, and the player does not necessarily have to directly touch the bar B to be controlled, thereby enabling the player to visually confirm the bar B with more ease.

In the aforementioned exemplary embodiments, a player controls a first object so as to hit a second object, thereby moving the second object. However, the second object may be moved in another method. For example, when the first object and the second object satisfy a predetermined positional relationship therebetween (for example, when a distance between the first object and second object is within a predetermined value), the second object may start to move at a movement speed of V and in a movement direction of θ during the game. Further, the player may directly control the second object (that is, the shell S) so as to move the second object on the plane. In this case, at a time of the stylus 16 stopping touching the touch panel 13 or a time of the operation switch 14 being pressed, the second object starts to move at a movement speed of V and in a movement direction of θ, thereby achieving a similar effect.

In addition, in the aforementioned exemplary embodiments, the touch panel 13 is integrated into the game apparatus 1. Needless to say, however, also when the game apparatus and the touch panel are separately provided, certain exemplary embodiments described herein are able to be realized. Further, although in the aforementioned exemplary embodiments two display devices are provided, the number of display devices provided may be only one. That is, in the aforementioned exemplary embodiments, it is also possible to provide only the touch panel 13 without the second LCD 12 being provided. In addition, in the aforementioned exemplary embodiments, the second LCD 12 is not provided and the touch panel 13 may be provided on the upper principal face of the first LCD 11.

Moreover, although in the aforementioned exemplary embodiments the touch panel 13 is integrated into the game apparatus 1, the touch panel is used as one of input devices for an information processing apparatus such as a typical personal computer. In this case, a program executed by the computer in the information processing apparatus is not limited to a game program which is typically used for a game, and the program is a general-purpose program in which the movement speed and the movement direction obtained in the aforementioned method are used for processing in the information processing apparatus.

The game apparatus and the storage medium according to the certain exemplary embodiments described herein are capable of reducing an influence of input jiggling occurring when a touch panel is touch-operated, and are useful as a game apparatus using a touch panel and the like as an input means and a storage medium executed by the game apparatus.

While the certain exemplary embodiments described herein have been described in detail, the foregoing description is in all aspects illustrative and not restrictive. It is understood that numerous other modifications and variations can be devised without departing form the scope of these certain exemplary embodiments.

What is claimed is:

1. A game apparatus for presenting a game in which a player controls a first object appearing in a game space to change a position of a second object which is different from the first object, the game apparatus comprising:

a display for displaying the game space on a display screen;

a touch panel provided such that the display screen is covered thereby;

an operation position detector for detecting, at a predetermined periodic cycle, position coordinates at which the touch panel is touch-operated;

a position coordinate storage section for storing the position coordinates detected by the operation position detector;

a movement parameter calculator for calculating at least one of a movement speed and a movement direction as a movement parameter for the second object based on current position coordinates and position coordinates having been detected in an immediately preceding time;

a movement parameter determiner for determining a new movement parameter using the movement parameters having been previously determined and the movement parameter calculated by the movement parameter calculator;

a movement parameter storage section for storing the movement parameter determined by the movement parameter determiner;

a first object display controller for display-controlling the first object according to the position coordinates detected by the operation position detector; and a second object display controller for moving and display-controlling the second object based on the updated movement parameter stored in the movement parameter storage section, when the first object and the second object satisfy a predetermined positional relationship therebetween, wherein the movement parameter calculator calculates both a movement speed and a movement direction as the movement parameter for the second object;

the movement parameter determiner calculates an average between the movement direction calculated by the movement parameter calculator and the movement direction which has been determined in an immediately preceding time and which is stored in the movement parameter storage section, thereby determining a new movement direction;

the movement parameter determiner calculates, when the movement speed calculated by the movement parameter calculator is lower than the movement speed which has been determined in an immediately preceding time and which is stored in the movement parameter storage section, an average between the movement speed which has been determined in the immediately preceding time and the movement speed calculated by the movement parameter calculator, thereby determining a new movement speed; and the movement parameter determiner determines, as a new movement speed, the movement speed calculated by the movement parameter calculator when the movement speed calculated by the movement parameter calculator is higher than or equal to the movement speed which has been determined in an immediately preceding time.

2. The game apparatus according to claim 1, wherein the movement parameter calculator calculates the movement parameter at the predetermined periodic cycle by using, as current position coordinates, position coordinates detected during a current periodic cycle, and using, as position coordinates having been detected in an immediately preceding time, position coordinates which have been detected during an immediately preceding periodic cycle.

3. The game apparatus according to claim 2, wherein the movement parameter calculator obtains a motion vector to current position coordinates from position coordinates which have been detected in an immediately preceding time and calculates, as the movement parameter, at least one of a movement speed and a movement direction based on the motion vector.

4. The game apparatus according to claim 1, further comprising an initial position storage section for storing initial position coordinates which are used for initially displaying the first object on the display screen, wherein the first object display controller display-controls, according to position coordinates detected by touch-operating the touch panel with the operation position detector, the first object using relative position data indicating a relative positional relationship between the initial position coordinates and position coordinates detected by touch-operating the touch panel with the operation position detector.

5. The game apparatus according to claim 1, further comprising a target display section for setting, in the game space, a target which is an object toward which the second object is moved and displaying the target on the display screen, wherein the second object display controller reduces, in one or more increments of a predetermined amount, a speed of the second object being moved based on the movement parameter, and display-controls the second object, the game apparatus further comprising a score calculator for calculating a score for the game using a positional relationship between position coordinates of the target and position coordinates at which the movement speed of the second object is reduced to zero.

6. A non-transitory storage medium having stored thereon a game program executed by a computer of a game apparatus for presenting a game in which a player controls a first object appearing in a game space to change a position of a second object which is different from the first object, wherein the game apparatus includes a display for displaying the game space on a display screen, a touch panel provided such that the display screen of the display section is covered thereby, and a storage section, the computer is operable to execute:

an operation position detection for detecting, at a predetermined periodic cycle, position coordinates at which the touch panel is touch-operated;

a position coordinate storage for storing, in the storage section, the position coordinates detected in the operation position detection;

a movement parameter calculation for calculating at least one of a movement speed and a movement direction as a movement parameter for the second object based on current position coordinates and position coordinates having been detected in an immediately preceding time;

a movement parameter determination for determining a new movement parameter using the movement parameters having been previously determined and the movement parameter calculated in the movement parameter calculation;

a movement parameter storage for storing, in the storage section, the movement parameter determined in the movement parameter determination;

a first object display control for display-controlling the first object according to the position coordinates detected in the operation position detection; and a second object display control for moving and display-controlling the second object based on the updated movement parameter stored in the movement parameter storage, when the first object and the second object satisfy a predetermined positional relationship therebetween, wherein the movement parameter calculation calculates both a movement speed and a movement direction as the movement parameter for the second object;

the movement parameter determination calculates an average between the movement direction calculated in the movement parameter calculation and the movement direction which has been determined in an immediately preceding time and which is stored in the storage section in the movement parameter storage, thereby determining a new movement direction;

the movement parameter determination calculates, when the movement speed calculated in the movement parameter calculation is lower than the movement speed which has been determined in an immediately preceding time and which is stored in the storage section in the movement parameter storage, an average between the movement speed which has been determined in the immediately preceding time and the movement speed calculated in the movement parameter calculation, thereby determining a new movement speed; and the movement parameter determination determines, as a new movement speed, the movement speed calculated in the movement parameter calculation when the movement speed calculated in the movement parameter calculation is higher than or equal to the movement speed which has been determined in an immediately preceding time.

7. The storage medium having the game program stored thereon according to claim 6, wherein the movement parameter calculation calculates the movement parameter at the predetermined periodic cycle by using, as current position coordinates, position coordinates detected during a current periodic cycle, and using, as position coordinates having been detected in an immediately preceding time, position coordinates which have been detected during an immediately preceding periodic cycle.

8. The storage medium having the game program stored thereon according to claim 7, wherein the movement parameter calculation obtains a motion vector to current position coordinates from position coordinates which have been detected in an immediately preceding time and calculates, as the movement parameter, at least one of a movement speed and a movement direction based on the motion vector.

9. The storage medium having the game program stored thereon according to claim 6, wherein
  the game program causes the computer to further execute an initial position storage for storing, in the storage section, initial position coordinates which are used for initially displaying the first object on the display screen, wherein
  the first object display control display-controls, according to position coordinates detected by touch-operating the touch panel in the operation position detection, the first object using relative position data indicating a relative positional relationship between the initial position coordinates and position coordinates detected by touch-operating the touch panel in the operation position detection.

10. The storage medium having the game program stored thereon according to claim 6, wherein
  the game program causes the computer to further execute a target display for setting, in the game space, a target which is an object toward which the second object is moved and displaying the target on the display screen,
  the second object display control reduces, in one or more increments of a predetermined amount, a speed of the second object being moved based on the movement parameter, and display-controls the second object, and
  the game program causes the computer to further execute a score calculation for calculating a score for the game using a positional relationship between position coordinates of the target and position coordinates at which the movement speed of the second object is reduced to zero.

* * * * *